US010067608B2

(12) United States Patent
Choi

(10) Patent No.: US 10,067,608 B2
(45) Date of Patent: Sep. 4, 2018

(54) TOUCH RECOGNITION APPARATUS AND CONTROL METHOD THEREOF

(71) Applicant: SAMSUNG ELECTRONICS CO., LTD., Suwon-si (KR)

(72) Inventor: Sung-do Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 131 days.

(21) Appl. No.: 15/167,087

(22) Filed: May 27, 2016

(65) Prior Publication Data
US 2016/0349922 A1 Dec. 1, 2016

Related U.S. Application Data

(60) Provisional application No. 62/166,882, filed on May 27, 2015.

(30) Foreign Application Priority Data

Dec. 7, 2015 (KR) .................. 10-2015-0173323

(51) Int. Cl.
G06F 3/041 (2006.01)
G06F 3/043 (2006.01)

(52) U.S. Cl.
CPC ............ G06F 3/0418 (2013.01); G06F 3/043 (2013.01)

(58) Field of Classification Search
CPC ................................ G06F 3/0418; G06F 3/043
See application file for complete search history.

(56) References Cited

U.S. PATENT DOCUMENTS

| 6,741,237 B1 | 5/2004 | Benard et al. |
| 2011/0316813 A1 | 12/2011 | Gu et al. |
| 2012/0299820 A1* | 11/2012 | Dahl ............... G06F 3/011 345/156 |
| 2013/0127783 A1* | 5/2013 | Lee ................ G06F 3/043 345/175 |
| 2015/0054794 A1 | 2/2015 | Li et al. |
| 2015/0063068 A1 | 3/2015 | Yu et al. |

FOREIGN PATENT DOCUMENTS

| KR | 10-2013-0142354 A | 12/2013 |
| WO | 2014/018116 A1 | 1/2014 |

OTHER PUBLICATIONS

Search Report dated Aug. 25, 2016, issued by the International Searching Authority in counterpart International Patent Application No. PCT/KR2016/005422 (PCT/ISA/210).
Written Opinion dated Aug. 25, 2016, issued by the International Searching Authority in counterpart International Patent Application No. PCT/KR2016/005422 (PCT/ISA/237).
Communication dated Mar. 27, 2018, issued by the European Patent Office in counterpart European Patent Application No. 16800273.1.

* cited by examiner

Primary Examiner — Charles Hicks
(74) Attorney, Agent, or Firm — Sughrue Mion, PLLC

(57) ABSTRACT

A touch recognition apparatus and a control method thereof are provided. The touch recognition apparatus includes ultrasonic sensors, and a processor configured to control the ultrasonic sensors to transmit ultrasonic signals at different respective times, detect ultrasonic signals that are reflected from an object to the ultrasonic sensors, based on the transmitted ultrasonic signals, and detect a touch point of the object based on a time of flight (ToF) of the reflected ultrasonic signals.

19 Claims, 12 Drawing Sheets

TOUCH RECOGNITION APPARATUS AND CONTROL METHOD THEREOF

CROSS-REFERENCE TO RELATED APPLICATIONS

This application claims priority from Korean Patent Application No. 10-2015-0173323, filed on Dec. 7, 2015, in the Korean Intellectual Property Office, and U.S. Provisional Application No. 62/166,882, filed on May 27, 2015, in the U.S. Patent and Trademark Office, the disclosures of which are incorporated herein by reference in their entireties.

BACKGROUND

1. Field

Apparatuses and methods consistent with exemplary embodiments relate to a touch recognition apparatus and a control method thereof, and more particularly, to an ultrasonic touch recognition apparatus and a control method thereof.

2. Description of the Related Art

A touch sensing apparatus, such as a touch screen, a touchpad, or the like, is an input device that is attached to a display apparatus to provide an intuitive input method to a user. The touch sensing apparatus has been widely applied to various types of electronic devices such as a portable phone, a personal digital assistant (PDA), a navigation system, etc. As demands for smartphones have increased, a ratio of using a touch screen as a touch sensing apparatus capable of providing various input methods in a limited form factor has also increased.

In addition, given that a virtual reality (VR) device to which a three-dimensional space touch technology indicating an effect of manipulating an object in the air by touching a hologram video has been widely used, a touch technology has been rapidly developed.

A touch screen applied to a portable device may be realized as a resistive type, a capacitive type, an infrared (IR) type, a surface acoustic wave (SAW) type, etc., according to methods of sensing touch inputs.

As compared to, e.g., a resistive type or capacitive type screen, in a SAW type touch screen, transmitted ultrasonic waves meet an obstacle, and thus sizes of waves are reduced. Because the SAW type touch screen has a high light penetrability, and high accuracy and definition, the SAW type touch screen has been widely applied mainly to an unmanned information terminal, etc.

However, there are disadvantages to a SAW type touch screen using a plurality of acoustic reverberators, and the related cost thereof increases.

Therefore, it would be advantageous to have methods of further conveniently increasing a recognition performance of a touch at a low cost.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide a touch recognition apparatus that may further accurately measure a touch point by using a Time of Flight (ToF) of an ultrasonic wave, and a control method thereof.

According to an aspect of an exemplary embodiment, there is provided a touch recognition apparatus including ultrasonic sensors, and a processor configured to control the ultrasonic sensors to transmit ultrasonic signals at different respective times, detect ultrasonic signals that are reflected from an object to the ultrasonic sensors, based on the transmitted ultrasonic signals, and detect a touch point of the object based on a time of flight (ToF) of the reflected ultrasonic signals.

The processor may be further configured to control the ultrasonic sensors to transmit the ultrasonic signals sequentially with a time delay interval between the ultrasonic signals in a detection time period.

The processor may be further configured to control the ultrasonic sensors to transmit initial ultrasonic signals simultaneously in an initial time period before the detection time period.

The processor may be further configured to determine, in the detection time period, different detection irradiation times of the irradiation of the respective ultrasonic signals and detection reception times at which the respective ultrasonic sensors receives ultrasonic signals that are reflected or refracted from the object, determine, in the initial time period, an initial irradiation time of the irradiation of the initial ultrasonic signals and initial reception times at which the respective ultrasonic sensors receives initial ultrasonic signals that are reflected or refracted from the object, and detect the reflected ultrasonic signals, based on the different detection irradiation times, the detection reception times, the initial irradiation time, the initial reception times, and the time delay interval.

The touch recognition apparatus may further include a storage configured to store the initial irradiation time and the initial reception times, and the processor may be further configured to retrieve the stored initial irradiation time and the stored initial reception times.

The time delay interval may be determined to be greater than a difference of reception times of the ultrasonic signals based on a maximum moving distance recognizable by the touch recognition apparatus of the object.

The processor may be further configured to control the ultrasonic sensors to transmit initial ultrasonic signals having different respective frequencies in an initial time period, and transmit the ultrasonic signals having different respective frequencies at the different respective times in a detection time period.

The processor may be further configured to control the ultrasonic sensors to transmit initial ultrasonic signals having different respective phases in an initial time period, and transmit the ultrasonic signals having different respective phases at the different respective times in a detection time period.

The processor may be further configured to control the ultrasonic sensors to transmit initial ultrasonic signals having different respective pulse durations in an initial time period, and transmit the ultrasonic signals having different respective pulse durations at the different respective times in a detection time period.

The processor may be further configured to control the ultrasonic sensors to transmit third ultrasonic signals simultaneously in a third time period.

The touch recognition apparatus may further include a display, and the object may be touched on the display.

According to an aspect of an exemplary embodiment, there is provided a method of controlling a touch recognition apparatus, the method including controlling ultrasonic sensors to transmit ultrasonic signals at different respective times, detecting ultrasonic signals that are reflected from an object to the ultrasonic sensors, based on the transmitted ultrasonic signals, and detecting a touch point of the object based on a time of flight (ToF) of the reflected ultrasonic signals.

The controlling the ultrasonic sensors to transmit the ultrasonic signals may include controlling the ultrasonic sensors to transmit the ultrasonic signals sequentially with a time delay interval between the ultrasonic signals in a detection time period.

The method may further include controlling the ultrasonic sensors to transmit initial ultrasonic signals simultaneously in an initial time period before the detection time period.

The detecting the reflected ultrasonic signals may include determining, in the detection time period, different detection irradiation times of the irradiation of the respective ultrasonic signals and detection reception times at which the respective ultrasonic sensors receives ultrasonic signals that are reflected or refracted from the object, determining, in the initial time period, an initial irradiation time of the irradiation of the initial ultrasonic signals and initial reception times at which the respective ultrasonic sensors receives initial ultrasonic signals that are reflected or refracted from the object, and detecting the reflected ultrasonic signals, based on the different detection irradiation times, the detection reception times, the initial irradiation time, the initial reception times, and the time delay interval.

The method may further include storing the initial irradiation time and the initial reception times, and the determining the initial irradiation time and the initial reception times may include retrieving the stored initial irradiation time and the stored initial reception times.

The time delay interval may be determined to be greater than a difference of reception times of the ultrasonic signals based on a maximum moving distance recognizable by the touch recognition apparatus of the object.

The method may further include controlling the ultrasonic sensors to transmit initial ultrasonic signals having different respective frequencies in an initial time period, and the controlling the ultrasonic sensors to transmit the ultrasonic signals may include controlling the ultrasonic sensors to transmit the ultrasonic signals having different respective frequencies at the different respective times in a detection time period.

The method may further include controlling the ultrasonic sensors to transmit initial ultrasonic signals having different respective phases in an initial time period, and the controlling the ultrasonic sensors to transmit the ultrasonic signals may include controlling the ultrasonic sensors to transmit the ultrasonic signals having different respective phases at the different respective times in a detection time period.

The method may further include controlling the ultrasonic sensors to transmit initial ultrasonic signals having different respective pulse durations in an initial time period, and the controlling the ultrasonic sensors to transmit the ultrasonic signals may include controlling the ultrasonic sensors to transmit the ultrasonic signals having different respective pulse durations at the different respective times in a detection time period.

According to an aspect of another exemplary embodiment, there is provided a touch recognition apparatus including a first ultrasonic sensor, a second ultrasonic sensor, and a processor configured to control the first ultrasonic sensor and the second ultrasonic sensor to transmit respective first ultrasonic signals at a first irradiation time in a first time period, control the first ultrasonic sensor and the second ultrasonic sensor to transmit respective second ultrasonic signals at different respective second irradiation times in a second time period, the first ultrasonic sensor being controlled to transmit prior to the second ultrasonic sensor being controlled to transmit, detect a first reflection signal and a second reflection signal that are reflected from an object to the first ultrasonic sensor and the second ultrasonic sensor, respectively, in the second time period, based on the transmitted first ultrasonic signals and the transmitted second ultrasonic signals, and detect a touch point of the object based on the detected first reflection signal and second reflection signal.

The first ultrasonic sensor may be further configured to receive a first signal that is reflected or refracted from the object at a first reception time in the second time period, and receive a second signal that is reflected or refracted from the object at a second reception time in the second time period, and the second ultrasonic sensor is further configured to receive a third signal that is reflected or refracted from the object at a third reception time in the second time period, and receive a fourth signal that is reflected or refracted from the object at a fourth reception time in the second time period.

The processor may be further configured to detect, as the first reflection signal, a signal, among the first signal and the second signal, having a reception time in the second time period that is equal to a reception time of a signal that is received by the first ultrasonic sensor in the first time period, and detect, as the second reflection signal, a signal, among the third signal and the fourth signal, having a reception time in the second time period that is equal to a sum of a reception time of a signal that is received by the second ultrasonic sensor in the first time period and a difference between the second irradiation times.

BRIEF DESCRIPTION OF THE DRAWING FIGURES

The above and/or other aspects will be more apparent by describing exemplary embodiments with reference to the accompanying drawings, in which.

DETAILED DESCRIPTION

Figure 1:
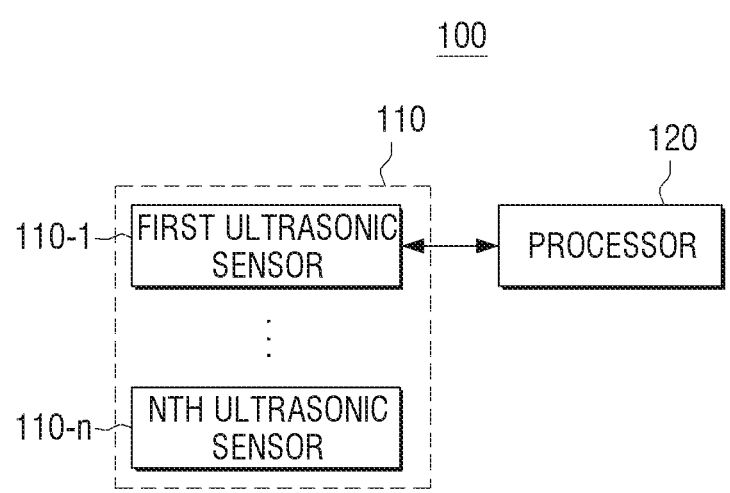
FIG. 1 is a block diagram of a touch recognition apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a block diagram of a touch recognition apparatus according to an exemplary embodiment. A touch recognition apparatus 100 refers to an electronic device that may receive a user command through a touch on a display or a touch on a three-dimensional space. Examples of the touch recognition apparatus 100 may include a smartphone, a camera, a tablet personal computer (PC), a notebook PC, a desktop PC, a media player (an MP3 player or the like), a PDA, a game terminal, a VR device, a wearable device, etc. Also, the touch recognition apparatus 100 according to an exemplary embodiment may also be applied to home appliances (e.g., a refrigerator, a washer, etc.) in which displays are mounted.

Referring to FIG. 1, the touch recognition apparatus 100 includes a plurality of ultrasonic sensors 110 and a processor 120.

The plurality of ultrasonic sensors 110 includes first to n ultrasonic sensors 110-1~110-n. The first to the nth ultrasonic sensor 110-1~110-n transmits(or irradiates) or receives an ultrasonic signal. The first to nth ultrasonic sensor 110-1~110-n transmit ultrasonic signals and receive reflected or refracted ultrasonic wave to detect a distance from the ultrasonic sensor to the object and a direction thereof. Here, an object may include a user's finger or a pen.

The processor 120 is a configuration to control overall operations of the touch recognition apparatus 100.

When the ultrasonic signals transmitted from the plurality of ultrasonic sensors 110 by the object are received by the plurality of ultrasonic sensors 110, based on a ToF of each of ultrasonic signals, the processor 120 may determine a touch point of the object.

For example, when ultrasonic signals respectively transmitted from the first ultrasonic sensor 110-1 and the second ultrasonic sensor 110-2 are reflected by the object and received respectively by the first ultrasonic sensor 110-1 and the second ultrasonic sensor 110-2, based on the ToF of the received ultrasonic signal, the processor 120 may calculate each distance from the first ultrasonic sensor 110-1 and the second ultrasonic sensor 110-2 to a touch point of the object. Based on the calculated distance, the processor 120 may determine a touch point of the object.

The processor 120 may detect a ToF indicating a time spent from the ultrasonic wave being transmitted from the transmitter of the first ultrasonic sensor 110-1, reflected by the object, and returned to the receiver of the first ultrasonic sensor 110-1. In this case, a speed of the ultrasonic wave is constant to be 340 m/s, and the processor 120, based on the detected ToF, may calculate a distance from the first ultrasonic sensor 110-1 to the object.

In addition, the processor 120 may detect a ToF that is spent from the ultrasonic wave being transmitted from the transmitter of the second ultrasonic sensor 110-2, reflected by the object, and returned to the receiver of the second ultrasonic sensor 110-2. Likewise, the processor 120, based on the detected ToF, may calculate a distance from the second ultrasonic sensor 110-2 to the object.

When a distance from the first ultrasonic sensor 110-1 and the second ultrasonic sensor 110-2 to the object is calculated, a position of the object can be calculated using trigonometry. That is, if it is assumed that in the touch recognition apparatus 100, the distance between the first ultrasonic sensor 110-1 and the second ultrasonic sensor 110-2 is well-known information, and if distance between the first ultrasonic sensor 110-1 and the object and a distance between the second ultrasonic sensor 110-2 and the object are calculated, three factors of triangle (length of three surfaces) are determined, and the processor 120 can determine a position of the object on the two-dimensional coordinate using trigonometry. In addition, by the above method, in consideration of a distance between three or more ultrasonic sensors disposed on different positions to the object, a position of the object on the three-dimensional coordinate can be determined.

Figure 2:
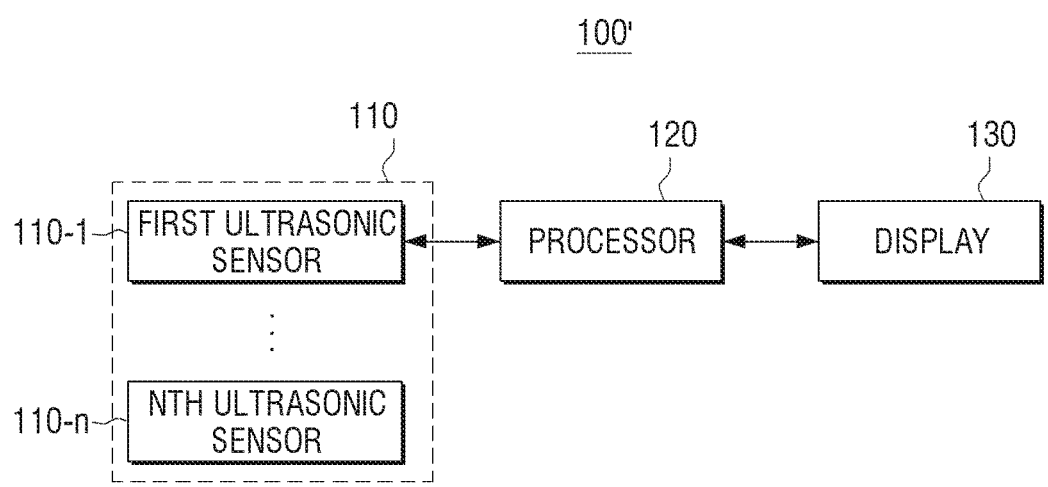
FIG. 2 is a block diagram of a touch recognition apparatus according to another exemplary embodiment.

FIG. 2 is a block diagram of a touch recognition apparatus according to another exemplary embodiment. As illustrated in FIG. 2, a touch recognition apparatus 100' according to another exemplary embodiment further includes a display 130.

The display 130 is an element that is touched by a user. In detail, the user may touch the display 130 in areas corresponding to various types of contents displayed on the display 130 by using a finger or an electronic pen to input desired information. In other words, the display 130 may be realized as a touch screen that displays contents and simultaneously operates as a touchpad.

The display 130 may be realized as various types of displays such as a liquid crystal display panel (LCDP), an organic light-emitting diode (OLED), a liquid crystal on Silicon (LCoS), digital light processing (DLP), etc. Also, the display 130 may include a driver circuit that is realized as a type such as an amorphous silicon (a-si) thin film transistor (TFT), a low temperature poly silicon (LTPS) TFT, an organic TFT (OTFT), etc., a backlight, etc.

Here, a glass substrate, a protecting film, etc. that are reinforced to protect the display 130 may be provided on a front surface of the display 130 that is touched.

The plurality of ultrasonic sensors 110 include the first through $n^{th}$ ultrasonic sensors 110-1 through 110-n and are elements that transmit and/or receive ultrasonic signals. The first through $n^{th}$ ultrasonic sensors 110-1 through 110-n are respectively provided on an outer part of the display 130 to transmit ultrasonic signals and receive ultrasonic signals reflected or refracted from an object to detect distances from the first through $n^{th}$ ultrasonic sensors 110-1 through 110-n to the object and a direction from the first through $n^{th}$ ultrasonic sensors 110-1 through 110-n to the object.

Figure 3:
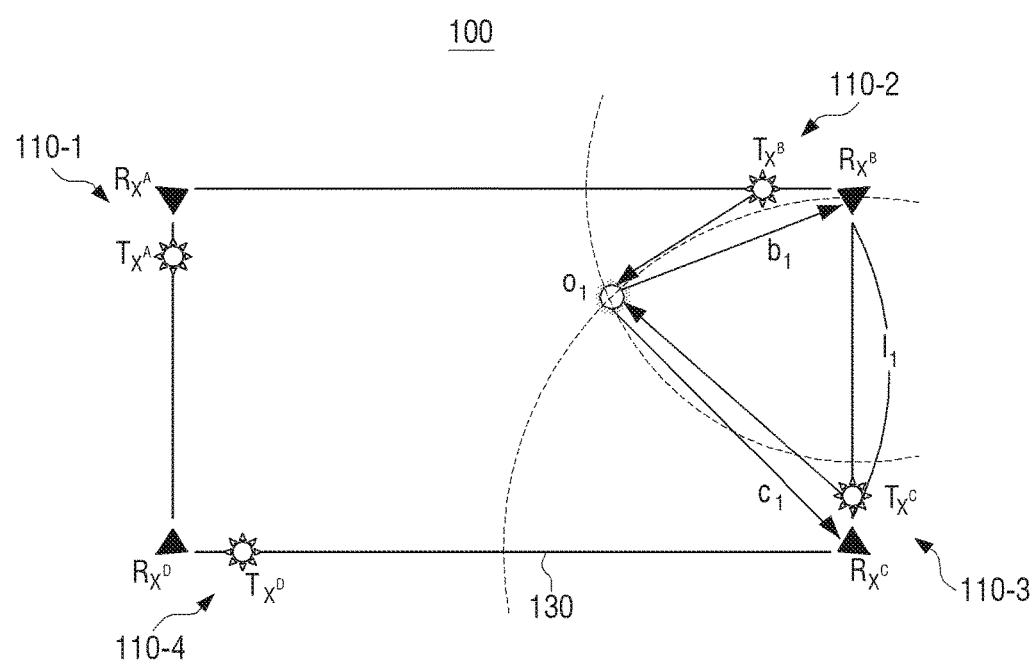
FIG. 3 is a diagram illustrating a method of determining a touch point of an object, according to an exemplary embodiment.

FIG. 3 is a diagram illustrating a method of determining a touch point of an object, according to an exemplary embodiment.

An exemplary embodiment in which first through fourth ultrasonic sensors 110-1 through 110-4 are respectively provided around corners of the display 130 one by one will now be described. However, exemplary embodiments are not limited thereto. Therefore, the touch recognition apparatus 100 may include two or three ultrasonic sensors in various positions of an outer part of the display 130, or five or more ultrasonic sensors in various positions.

As shown in FIG. 3, it is assumed that an object $o_1$ is touched on the display 130. In this case, the processor 120 may detect a ToF that is a time during which an ultrasonic wave is transmitted from a transmitter $T_x^B$ of the second ultrasonic sensor 110-2, is reflected from the object $o_1$, and then returned to a receiver $R_x^B$ of the second ultrasonic sensor 110-2. The processor 120 may calculate a distance $b_1$ from the second ultrasonic sensor 110-2 to the object $o_1$ based on the detected ToF.

In addition, the processor 120 may detect time a $ToF_2$ that is a time during which an ultrasonic wave is transmitted from a transmitter $T_x^C$ of the third ultrasonic sensor 110-3, is reflected by the object $o_1$ and returned to the receiver $R_x^C$ of the third ultrasonic sensor 110-3. The processor 120, based on the detected $ToF_2$, may calculate a distance $c_1$ from the third ultrasonic sensor 110-3 to the object $o_1$.

If the distances $b_1$ and $c_1$ are calculated, a position of the object $o_1$ on the display 130 may be calculated by trigonometry. In other words, a distance $l_1$ between the second ultrasonic sensor 110-2 and the third ultrasonic sensor 110-3 is assumed as information of a base station in the touch recognition apparatus 100. When the distance $b_1$ from the second ultrasonic sensor 110-2 to the object $o_1$ and the distance $c_1$ from the third ultrasonic sensor 110-3 to the object $o_1$ are calculated, three elements (lengths of three sides) of a triangle may be determined, and the processor 120 may determine a position of the object $o_1$ on a 2-dimensional (2D) coordinate of the display 130 by using trigonometry.

As a result, the processor 120 may determine a touch point of the object $o_1$ based distances of the object $o_1$ from the second ultrasonic sensor 110-2 and the third ultrasonic sensor 110-3, respectively.

As described above, distances from a minimum of two respective ultrasonic sensors may be calculated to determine the touch point of the object $o_1$. Here, ultrasonic sensors used for a distance calculation may be variously selected, but an ultrasonic sensor detecting a fastest ToF, i.e., an ultrasonic sensor that is a shortest distance from the object $o_1$, and an ultrasonic sensor close to the ultrasonic sensor that is the shortest distance from the object $o_1$, may be selected to be included.

Figure 4:
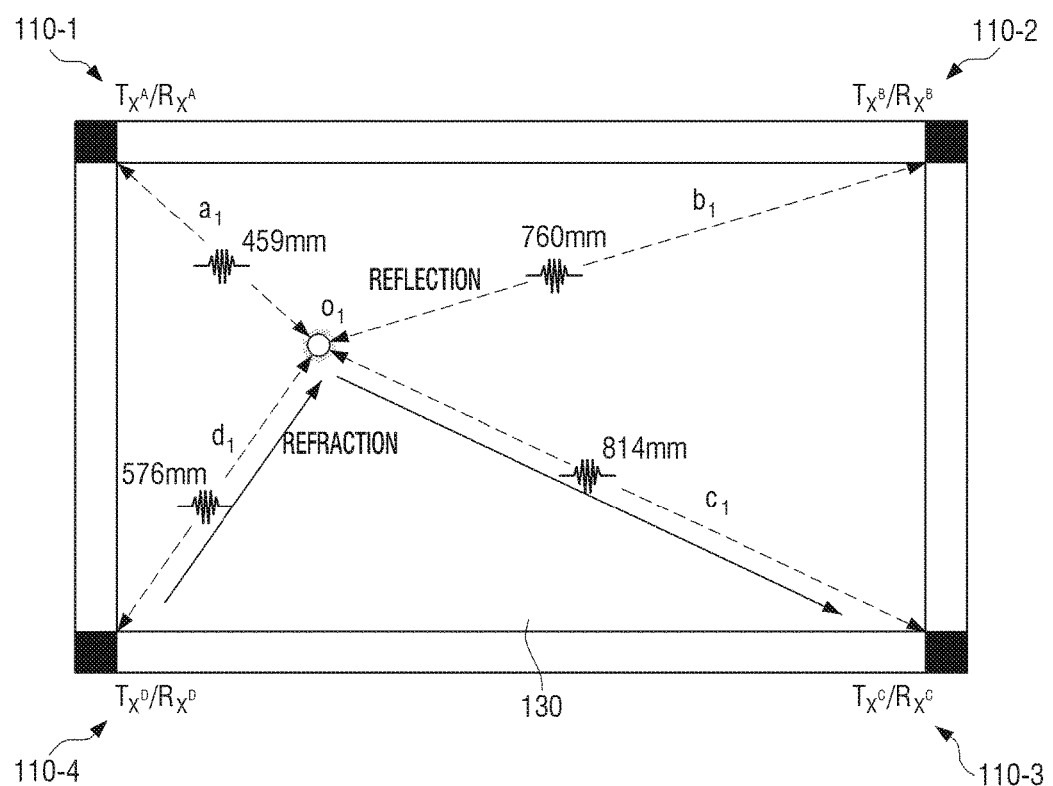
FIG. 4 is a diagram illustrating a problem according to refraction of an ultrasonic signal.

FIG. 4 is a diagram illustrating a problem according to refraction of an ultrasonic signal.

FIG. 4 integrates and illustrates transmitters $T_x^A \sim T_x^D$ and receivers $R_x^A \sim R_x^D$, respectively. As illustrated in FIG. 4, an ultrasonic signal transmitted from one of the transmitters $T_x^A \sim T_x^D$ of the plurality of ultrasonic sensors 110-1~110-4 is reflected by the object $o_1$ and is received by a respective one of the receivers $R_x^A \sim R_x^D$ of the ultrasonic sensors 110-1~110-4. For example, as illustrated in FIG. 4, distances $a_1$, $b_1$, $c_1$, and $d_1$ of straight lines from the first ultrasonic sensor to the fourth ultrasonic sensor 110-1~110-4 to the touched object $o_1$ may be 459 mm, 760 mm, 814 mm, and 576 mm, respectively. In this case, the processor 120 may calculate the ToF of the ultrasonic signal that is reflected and returned from the object $o_1$, and accordingly, on the display, may calculate the distance from the respective ultrasonic sensors 110-1~110-4 to the object $o_1$.

However, in this case, each of the ultrasonic sensors 110-1~110-4 also receives an ultrasonic signal transmitted from another ultrasonic sensor and refracted by the object $o_1$, and it is difficult for the processor 120 to discern whether the received signal is a reflected signal or refracted signal from another ultrasonic sensor.

For example, as illustrated in FIG. 4, if an ultrasonic signal is transmitted from the transmitter $T_x^D$ of the fourth ultrasonic sensor 110-4, other than signals reflected by the object $o_1$ and received using the receiver $R_x^D$ by the fourth ultrasonic sensor 110-4, a signal refracted by the object $o_1$ and received by the receivers $R_x^A \sim R_x^C$ of the first, the second, and the third ultrasonic sensors 110-1~110-3 is generated. That is, each of the ultrasonic sensors 110-1~110-4 receives an ultrasonic signal transmitted and refracted from another ultrasonic sensor, and in addition to the reflection signal, receives three refraction signals.

Figure 5:
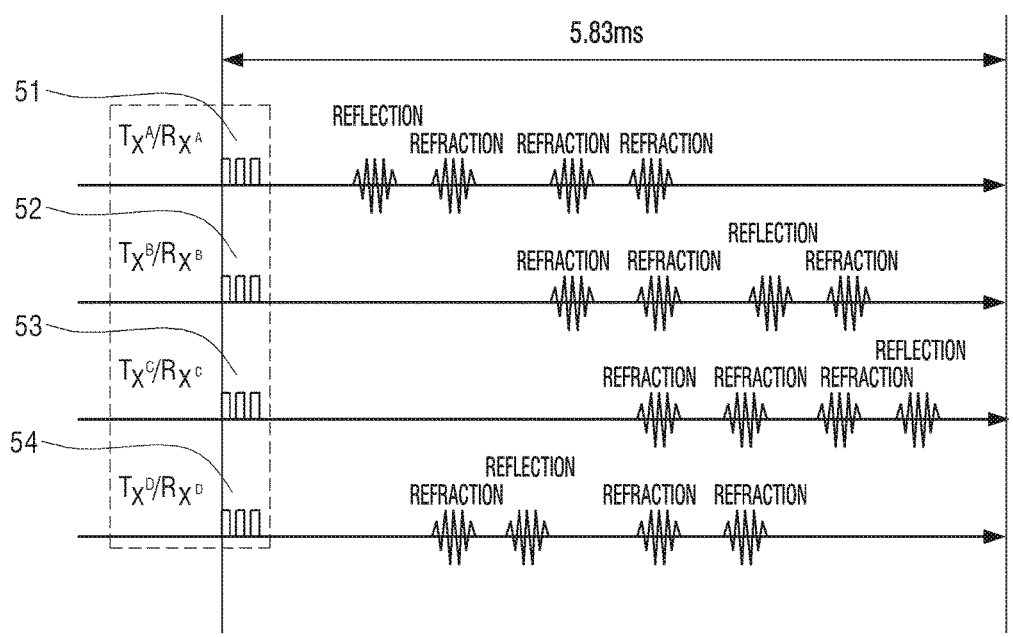
FIG. 5 is a diagram illustrating a waveform of an ultrasonic signal received by each ultrasonic sensor according to refraction of an ultrasonic signal.

FIG. 5 is a diagram illustrating a waveform of an ultrasonic signal received by each ultrasonic sensor according to refraction of an ultrasonic signal.

As illustrated in FIG. 5, ultrasonic signals 51~54 can be simultaneously transmitted at each region for a predetermined frequency (5.83 ms) from the transmitters $T_x^A \sim T_x^D$ of the respective ultrasonic sensors 110-1~110-4. Here, the frequency of irradiation of the ultrasonic signals 51~54 can be determined based on a size of a display. It is desirable that the irradiation frequency of the ultrasonic signals 51~54 is more than a time that is used so that the ultrasonic signal is reflected by the object that is located farthest from the ultrasonic sensor among the display areas touchable by the object, and returns thereto. Here, each region where ultrasonic sensors transmit ultrasonic signals periodically can be named a preset detection region.

The receivers $R_x^A \sim R_x^D$ of the respective ultrasonic sensors 110-1~110-4 may receive a refraction signal from another ultrasonic sensor in addition to a reflection signal that is reflected and returned by the object. As illustrated in FIG. 5, when the object $o_1$ is nearest to the first ultrasonic sensor 110-1 among the plurality of ultrasonic sensors 110-1~110-4, the receiver $R_x^A$ of the first ultrasonic sensor 110-1 receives a signal reflected by the object $o_1$ first, and then receives a refracted signal from the ultrasonic sensors 110-2~110-4 by order which are closest to the object $o_1$.

Therefore, the processor 120, to calculate ToF, may distinguish a reflection signal from remaining three refraction signals among the received four signals. However, a waveform of a reflection signal is not that different from that of a refraction signal, and thus, it is not easy to discern. Therefore, when the reflection signal is not discerned from the refraction signal, it is highly likely that touch recognition error may be generated.

To overcome the above problem, in the related art, a method that the ultrasonic sensors 110-1~110-4 sequentially transmit ultrasonic waves for each detection region using a time sharing method is used. However, such a method uses substantial time for touch recognition, when there are lots of ultrasonic sensors, and thus, the method is not effective. For example, when one detection region is 5.8 ms, when there are four ultrasonic sensors, a time of 5.8×4 ms is used, thus resulting in a fall of touch recognition performance. Therefore, the exemplary embodiments enable rapid distinguishing between a reflection signal and a refraction signal even when time sharing is not used.

Figure 6:
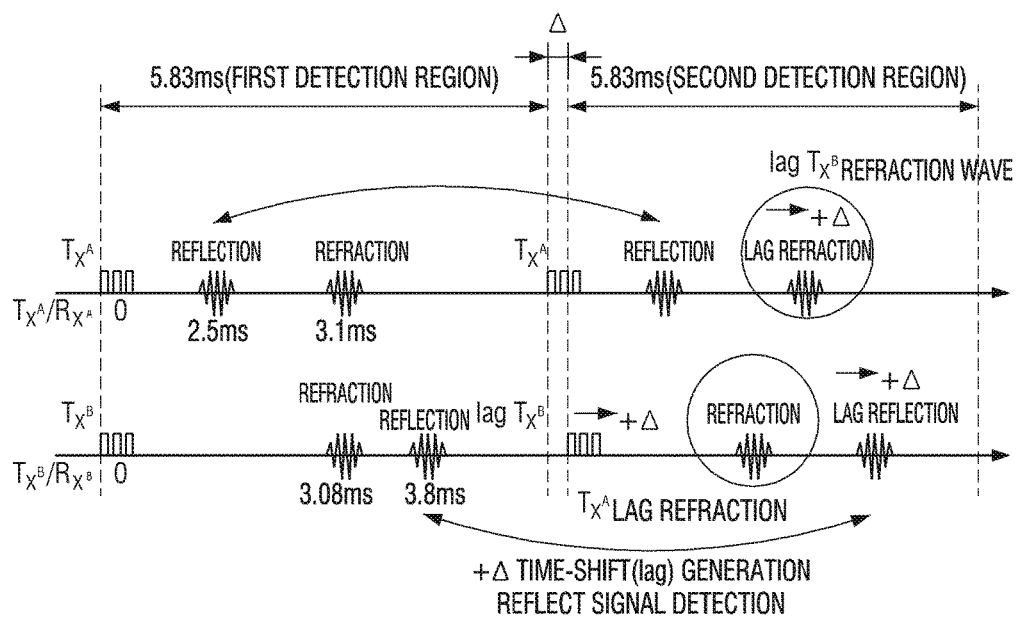
FIGS. 6 and 7 are diagrams illustrating a method of distinguishing an ultrasonic signal transmitted from each ultrasonic sensor, according to an exemplary embodiment.
Figure 7:
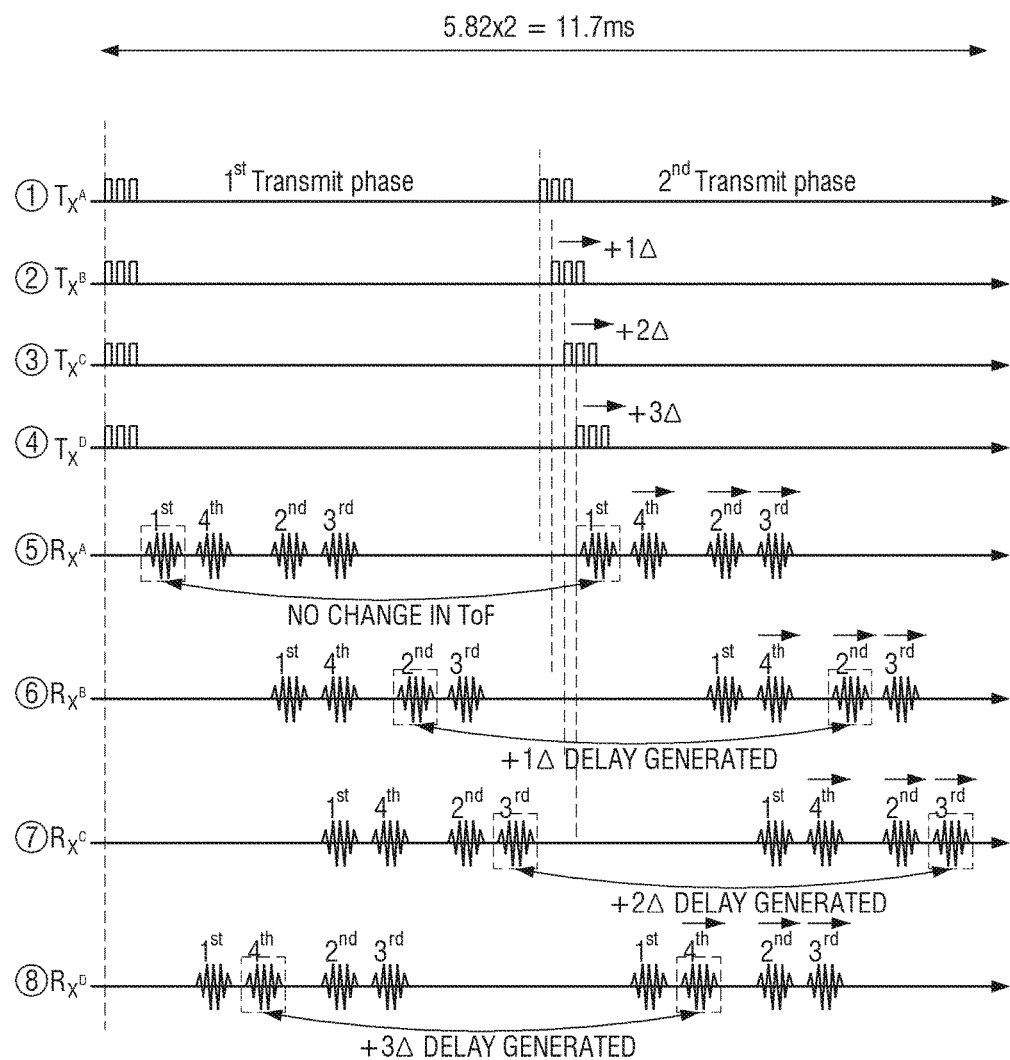

FIGS. 6 and 7 are diagrams illustrating a method for distinguishing ultrasonic signals transmitted from each ultrasonic sensor, according to an exemplary embodiment.

FIG. 6 briefly illustrates an idea to distinguish a reflection signal and a refraction signal. Each of the ultrasonic sensors 110-1~110-4 may transmit ultrasonic signals for each detection region irradiating ultrasonic signals. FIG. 6 illustrates, among the plurality of ultrasonic sensors 110-1~110-4, waveforms of ultrasonic signals transmitted from the first ultrasonic sensor 110-1 and the second ultrasonic sensor 110-2, and waveforms of reflection and refraction signals received from each of the ultrasonic sensors 110-1~110-2.

The processor 120 may control the plurality of ultrasonic sensors 110-1~110-4 so that each of the plurality of ultrasonic sensors 110-1~110-4 transmits ultrasonic signals with different time intervals, and based on the ToF of ultrasonic signals reflected and received by the object $o_1$, may detect a touch point of the object $o_1$.

As illustrated in FIG. 6, ultrasonic signals are transmitted simultaneously at the transmitters $T_x^A$, $T_x^B$ of the first and second ultrasonic sensors 110-1, 110-2 in the first detection region. At the each of the receivers $R_x^A$, $R_x^B$ of the respective ultrasonic sensors 110-1, 110-2, a signal reflected and a signal refracted by the object $o_1$ are received. The first ultrasonic sensor 110-1 sequentially receives a reflection signal and a refraction signal from the second ultrasonic sensor 110-2. The second ultrasonic sensor 110-2 receives a refraction signal from the first ultrasonic sensor 110-1 first and then receives a reflection signal. In the first detection region, it is not known which signal is a reflection signal or a refraction signal among the signals received from the ultrasonic sensors 110-1, 110-2, but, using information regarding time of receiving the reflection signal and the refraction signal in the first detection region, the reflection signal or the refraction signal can be determined in the second detection region.

In detail, the processor 120, with respect to the first and the second ultrasonic sensors 110-1, 110-2, receives information regarding times (2.5 ms and 3.1 ms for the first ultrasonic sensor, 3.08 ms and 3.8 ms for the second ultrasonic sensor) of receiving a reflection signal and a refraction signal from a starting point of the first detection region to irradiation of the ultrasonic signal (0 ms, 0 ms). In this case, the touch recognition apparatus 100 according to an exemplary embodiment may further include a storage 140 storing information regarding a reflection signal and a refraction signal by ultrasonic sensors in the first detection region.

Thereafter, the processor 120, in the second detection region, may control the first and the second ultrasonic sensors 110-1, 110-2 to respectively transmit ultrasonic signals at different times. The processor 120, so that the first and the second ultrasonic sensors 110-1, 110-2 transmit ultrasonic signals at different times in the second detection region, may delay times of irradiating ultrasonic signals with respect to at least one among the first and the second ultrasonic sensors 110-1, 110-2.

That is, the processor 120 may control the time of irradiating an ultrasonic wave at the first ultrasonic sensor 110-1 from the starting point of the second detection region to correspond to the time of irradiating an ultrasonic wave at the first ultrasonic sensor 110-1 from the starting point of the first detection region. At this time, the time of receiving a reflection signal from the starting point of the second detection region by the first ultrasonic sensor 110-1 corresponds to the time of receiving a reflection signal from the starting point of the first detection region by the first ultrasonic sensor 110-1.

The processor 120, as illustrated in FIG. 6, may control the second ultrasonic sensor 110-2 so that there is time shift of Δ ms between the time of irradiating an ultrasonic wave at the second ultrasonic sensor 110-2 from the starting point of the second detection region and the time of irradiating an ultrasonic wave at the second ultrasonic sensor 110-2 from the starting point of the first detection region. For example, the processor 120, in the second detection region, may control the second ultrasonic sensor 110-2 so that an ultrasonic wave is transmitted at the shifted time (0+Δ ms) that is shifted as much as Δ ms from the time of irradiating ultrasonic wave in the first detection region.

At this time, while a reflection signal by the ultrasonic signal shifted as much as Δ ms and transmitted from the starting point of the second detection region in the second ultrasonic sensor 110-2 is time shifted (3.8+Δ ms) as much as Δ ms, a refraction signal received by the second ultrasonic sensor 110-2 from the first ultrasonic sensor 110-1 has no time shift (3.08 ms).

In the second detection region of the first ultrasonic sensor 110-1, a refraction signal by the second ultrasonic sensor 120 can be time shifted (3.1+Δ ms) as much as Δ ms more than a time of receiving a refraction signal received in the first detection region. However, a reflection signal transmitted by the first ultrasonic sensor 110-1 and received at the first ultrasonic sensor 110-1 has no time shift (2.5 ms).

By the above process, the processor 120, in the first detection region and the second detection region may analyze a signal waveform received by the first ultrasonic sensor 110-1 and determine that a signal with no time shift as a reflection signal and a signal with time shift as a refraction signal. The processor 120, by considering a time of receiving a reflection signal excluding a refraction signal, may calculate a ToF between the first ultrasonic sensor 110-1 and the object $o_1$ in the second detection region, and by using the calculated ToF, may derive the distance between the first ultrasonic sensor 110-1 and the object $o_1$.

In addition, the processor 120, in the first detection region and the second detection region, may analyze a signal waveform received by the second ultrasonic sensor 110-2, and determine a signal with time shift as a reflection signal, and a signal without time shift as a refraction signal. The processor 120, only in consideration of a time of receiving a reflection signal excluding a refraction signal, may calculate a ToF between the second ultrasonic sensor 110-2 and the object $o_1$ in the second detection region, and by using the calculated ToF, may derive a distance between the second ultrasonic sensor 110-2 and the object $o_1$. That is, the processor 120, by controlling ultrasonic sensors 110-1, 110-2 so that the first ultrasonic sensor 110-1 and the second ultrasonic sensor 110-2 respectively transmit ultrasonic signals with different time intervals, can calculate the ToF of the ultrasonic signal.

Time shift indicates, in a preset detection region, the time difference (Δ ms) in which an ultrasonic sensor transmits an ultrasonic signal at a time earlier or later than a preset time. Hereinafter, in a case of irradiating an ultrasonic signal later as much as Δ ms with respect to a starting point of the detection region, an ultrasonic signal of the ultrasonic sensor is delayed as much as Δ ms. In addition, when irradiating an ultrasonic signal later as much as Δ ms than an ultrasonic signal transmitted from another ultrasonic sensor, an ultrasonic signal of an ultrasonic sensor is delayed as much as Δ ms than an ultrasonic signal of another ultrasonic sensor.

FIG. 7 is a diagram illustrating a method of distinguishing a received waveform of an ultrasonic signal by the entire ultrasonic sensor according to an exemplary embodiment. As illustrated in FIG. 7, in the first detection region (i.e., a first transmit phase), each of the ultrasonic sensors 110-1~110-4 may transmit ultrasonic signals at the same time. Portions ① to ④ indicate, in the first and second detection regions (i.e., first and second transmit phases), ultrasonic signals transmitted from the transmitters $T_x^A$~$T_x^D$ of the respective ultrasonic sensors 110-1~110-4.

As illustrated in FIG. 7, the processor 120, in the second detection region, may control the first ultrasonic sensor 110-1 to transmit an ultrasonic signal at a time corresponding to an ultra wave irradiating time in the first detection region. In addition, the processor 120, in the second detection region, may control the second ultrasonic sensor 110-2 to transmit an ultrasonic wave at time that is delayed as much as $\Delta$ ms than a time corresponding to an ultrasonic wave transmitted in the first detection region. Further, the processor 120, in the second detection region, may control the third ultrasonic sensor 110-3 to transmit ultrasonic wave at a time that is delayed as much as $2\Delta$ ms than a time corresponding to a time of an ultrasonic wave transmitted in the first detection region. In addition, the processor 120, in the second detection region, may control the fourth ultrasonic sensor 110-4 to refract an ultrasonic wave at a time that is delayed as much as 3 $\Delta$ms than a time corresponding to a time of irradiation of an ultrasonic wave in the first detection region. That is, the processor 120, in the second detection region, may control the ultrasonic sensors 110-1~110-4 to be different from each other in terms of irradiation times as much as a predetermined delay (e.g., $\Delta$ ms).

Portions ⑤ to ⑧, in the first and second detection regions, indicate ultrasonic signals reflected and refracted to the receivers $R_x^A$~$R_x^D$ of the respective ultrasonic sensors 110-1~110-4. As illustrated in FIG. 7, in the first detection region, a reflection signal and a refraction signal that are sequentially reflected and refracted from the first to the fourth ultrasonic sensors 110-1~110-4 can be detected. In this case, a signal received at each of the ultrasonic sensors 110-1~110-4 can be detected in the order of the ultrasonic sensors closest to the object $o_1$.

For example, when the ultrasonic sensors closest to the object $o_1$ are in the order of the first ultrasonic sensor, the fourth ultrasonic sensor, the second ultrasonic sensor, and the third ultrasonic sensor, as illustrated in FIG. 7, the reflection and refraction signals received at the first ultrasonic sensor 110-1 can be detected in the order of a reflection signal from the first ultrasonic sensor 110-1, a refraction signal from the fourth ultrasonic sensor 110-4, a refraction signal from the second ultrasonic sensor 110-2, and a refraction signal from the third ultrasonic sensor 110-3.

In addition, the reflection and refraction signals received at the second ultrasonic sensor 110-2 can be detected in an order of a refraction signal from the first ultrasonic sensor 110-1, a refraction signal from the fourth ultrasonic sensor 110-4, a reflection signal from the second ultrasonic sensor 110-2, and a refraction signal from the third ultrasonic sensor 110-3.

In addition, the reflection and refraction signal received at the third ultrasonic sensor 110-3 can be detected in an order of a refraction signal from the first ultrasonic sensor 110-1, a refraction signal from the fourth ultrasonic sensor 110-4, a refraction signal from the second ultrasonic sensor 110-2, and a reflection signal from the third ultrasonic sensor 110-3.

In addition, the reflection and refraction signal received at the fourth ultrasonic sensor 110-4 can be detected in an order of a refraction signal from the first ultrasonic sensor 110-1, a reflection signal from the fourth ultrasonic sensor 110-4, a refraction signal from the second ultrasonic sensor 110-2, a refraction signal from the third ultrasonic sensor 110-3.

As illustrated in FIG. 7, in the second detection region, a reflection signal of the first ultrasonic sensor 110-1 received by the first ultrasonic sensor 110-1 has no delay, but a refraction signal of the second ultrasonic sensor 110-2 has a delay as much as $\Delta$ ms, a refraction signal of the third ultrasonic sensor 110-3 has a delay as much as $2\Delta$ ms, and a refraction signal of the fourth ultrasonic sensor has a delay as much as 3 $\Delta$ ms. Therefore, the processor 120 may determine a signal without delay as a reflection signal of the first ultrasonic sensor 110-1. In addition, the processor 120 may determine a signal with a delay of $\Delta$ ms as a refraction signal of the second ultrasonic sensor 110-2, a signal with a delay of $2\Delta$ ms as a refraction signal of the third ultrasonic sensor 110-3, a signal with a delay of 3 $\Delta$ ms as a refraction signal of the fourth ultrasonic sensor 110-4. As such, the processor 120 may determine that each reflection signal and refraction signal is refracted or reflected from which ultrasonic sensor, according to a degree of delay.

In the same fashion, in the second detection region, a refraction signal of the first ultrasonic sensor 110-1 received by the second ultrasonic sensor 110-2 has no delay, but the reflection signal of the second ultrasonic sensor 110-2 received by the second ultrasonic sensor 110-2 has a delay as much as $\Delta$ ms. Therefore, the processor 120 may determine a signal without delay as a refraction signal of the first ultrasonic sensor 110-1. In addition, the processor 120 may determine a signal with a delay of $\Delta$ ms as a reflection signal of the second ultrasonic sensor 110-2, a signal with a delay of $2\Delta 0$ ms as a refraction signal of the third ultrasonic sensor 110-2, and a signal with a delay of 3 $\Delta$ ms as a refraction signal of the fourth ultrasonic sensor 110-2.

In the second detection region, a refraction signal of the first ultrasonic sensor 110-1 received by the third ultrasonic sensor 110-3 has no delay, but a reflection signal of the third ultrasonic sensor 110-3 received by the third ultrasonic sensor 110-3 has a delay as much as $2\Delta$ ms. Therefore, the processor 120 may determine a signal without delay as a refraction signal of the first ultrasonic sensor 110-1. In addition, the processor 120 may determine a signal with a delay of $\Delta$ ms as a refraction signal of the second ultrasonic sensor 110-2, a signal with a delay of $2\Delta$ ms as a reflection signal of the third ultrasonic sensor 110-3, and a signal with a delay of $3\Delta$ ms as a refraction signal of the fourth ultrasonic sensor 110-4.

In the second detection region, a refraction signal of the first ultrasonic sensor 110-1 received by the fourth ultrasonic sensor 110-4 has no delay, but a reflection signal of the fourth ultrasonic sensor 110-4 received by the fourth ultrasonic sensor 110-4 has a delay as much as 3 $\Delta$ ms. Therefore, the processor 120 may determine a signal without delay as a refraction signal of the first ultrasonic sensor 110-1. In addition, the processor 120 may determine a signal with a delay of $\Delta$ ms as a refraction signal of the second ultrasonic sensor 110-2, a signal with a delay of $2\Delta$ ms as a refraction signal of the third ultrasonic sensor 110-3, and a signal with a delay of $3\Delta$ ms as a reflection signal of the fourth ultrasonic sensor 110-4.

Figure 8:
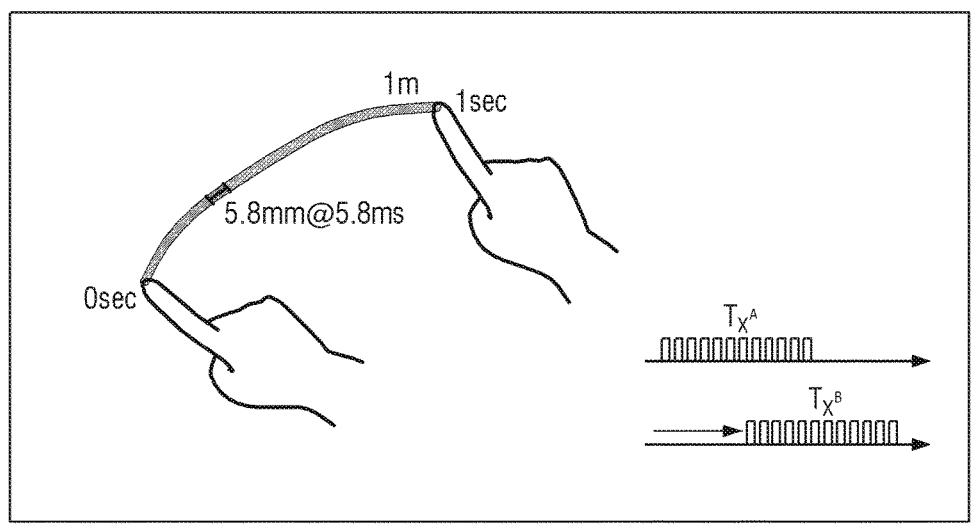
FIG. 8 is a diagram illustrating a condition for determining a time shift value of each ultrasonic signal, according to an exemplary embodiment.

FIG. 8 is a diagram illustrating a condition for determining a time shift value of each ultrasonic signal, according to an exemplary embodiment.

In an exemplary embodiment, time shift may be, in a preset detection region, determined to be greater than the difference of receiving times of ultrasonic signals according to a maximum movement distance that can be recognized by the touch recognition apparatus of the object. If it is assumed that a distance of touching and dragging for 1 second using a finger of a user is 1 m to the maximum, a movable distance of the object is a maximum of 5.8 mm for a preset detection region (5.8 ms). In this case, due to movements of the object, the maximum phase difference of ultrasonic waves generating in two detection regions is a value calculated by dividing the maximum moving distance of the object by a velocity of an ultrasonic wave (5.8 mm/343 m/s=16.9 μs). Therefore, the minimum phase difference for synchronizing phase differences in two detection regions, that is, a minimum value of a time shift can be determined to be 33.8 μs that is two times of 16.9 μs.

Figure 9:
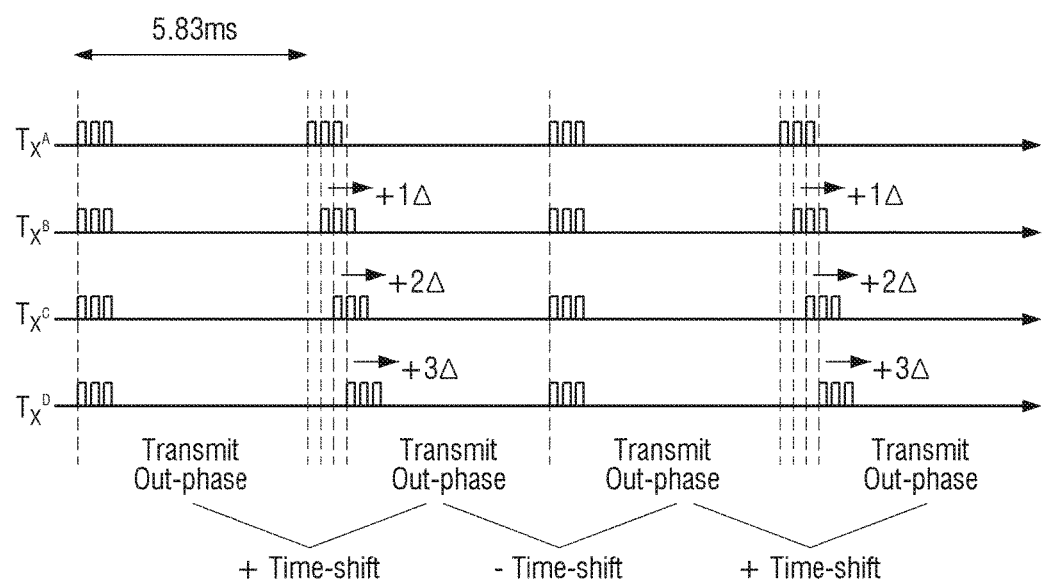
FIG. 9 is a diagram illustrating a method of distinguishing an ultrasonic signal transmitted from each ultrasonic sensor, according to an exemplary embodiment.

FIG. 9 is a diagram illustrating a method of distinguishing an ultrasonic signal transmitted from each ultrasonic sensor, according to an exemplary embodiment.

As described in FIG. 9, in the first detection region and the second detection region, an irradiation pattern of an ultrasonic signal of each of the ultrasonic sensors 110-1~110-4 can be repeated. That is, in the third detection region after the second detection region, the processor 120 may control the ultrasonic sensors 110-1~110-4 to transmit a plurality of ultrasonic signals at a time corresponding to a time of irradiating a plurality of ultrasonic signals in the first detection region.

In this case, the processor 120, based on different receiving time intervals according to a plurality of ultrasonic signals that are transmitted with different time intervals by the respective ultrasonic sensor 110-1~110-4 in the second detection region and the third detection region, may calculate a ToF by determining ultrasonic sensors irradiating received ultrasonic signals. The processor 120 may store, in the storage 140, information on times of irradiating ultrasonic signals by the plurality of ultrasonic sensors 110-1~110-4 in the second detection region and times of receiving each ultrasonic signal that is reflected by the object.

Thereafter, the processor 120, by using times of irradiating ultrasonic signals by the plurality of ultrasonic sensor 110-1~110-4 in the third detection region, the times of receiving an ultrasonic signal, and information received in the storage 140, may determine ultrasonic sensors irradiating ultrasonic signals.

Figure 10:
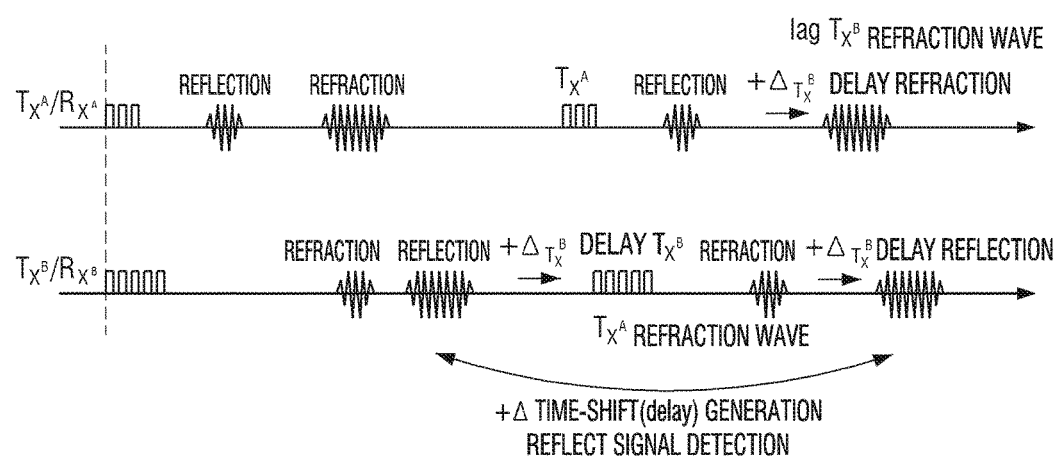
FIG. 10 is a diagram illustrating a method of distinguishing an ultrasonic signal transmitted from each ultrasonic sensor using differences of a signal pattern, according to an exemplary embodiment.

FIG. 10 is a diagram illustrating a method of distinguishing an ultrasonic signal transmitted from each ultrasonic sensor by using differences of a signal pattern, according to an exemplary embodiment.

According to an exemplary embodiment, the plurality of ultrasonic sensors 110-1~110-4 of the touch recognition apparatus 100 can have different ultrasonic signal frequencies. By implementing ultrasonic signals transmitted from the respective ultrasonic sensor 110-1~110-4 and of different frequencies, the effect of separating ultrasonic signals that are transmitted and refracted by the object $o_1$ from another can be improved.

In addition, according to another exemplary embodiment, the processor 120 may control phases of ultrasonic signals transmitted from the plurality of ultrasonic sensor 110-1~110-4 to be different from each other. The processor 120, with respect to ultrasonic signals transmitted from each ultrasonic sensor, may partially control according to a time resolution. For example, the processor 120 may control to transmit ultrasonic signals having different phases so that a phase of the ultrasonic signal transmitted from the first ultrasonic sensor 110-1 is 0°, a phase of the ultrasonic signal transmitted from the second ultrasonic sensor 110-2 is 90°, a phase of the ultrasonic signal transmitted from the third ultrasonic sensor 110-3 is 180°, and a phase of the ultrasonic signal transmitted from the fourth ultrasonic sensor 110-4 is 270°. That is, ultrasonic signals having different phases can be transmitted. Accordingly, the effect of separation of ultrasonic signals that are transmitted from different ultrasonic sensors and are refracted by the object $o_1$, from the ultrasonic signal received by each ultrasonic sensor can be improved.

In addition, according to another exemplary embodiment, the processor 120 may control pulse durations of ultrasonic signals transmitted from the plurality of ultrasonic sensors 110-1~110-4 to be different from each other, and distinguish them as refraction signals or reflection signals from the respective ultrasonic sensors 110-1~110-4.

As described above, by appropriately combining the frequency sharing method, phase control method, and pulse duration adjustment method with the time shift method with respect to ultrasonic wave irradiation frequency, a probability to distinguish a reflection signal and a refraction signal can be improved.

As illustrated in FIG. 10, the processor 120 may adjust the ultrasonic irradiation timing in the second detection region of the second ultrasonic sensor 110-2 to be different from the first ultrasonic sensor 110-1, to distinguish the reflection signal from the refraction signal received by each of the ultrasonic sensors 110-1~110-2. In addition to the above, the processor 120 may control so that a pulse duration time (e.g., three pulses) of an ultrasonic wave transmitted from the first ultrasonic sensor 110-1 is different from that (e.g., five pulses) of an ultrasonic wave transmitted from the second ultrasonic sensor 110-2 to increase a probability of distinguishing a reflection signal from a refraction signal.

Figure 11:
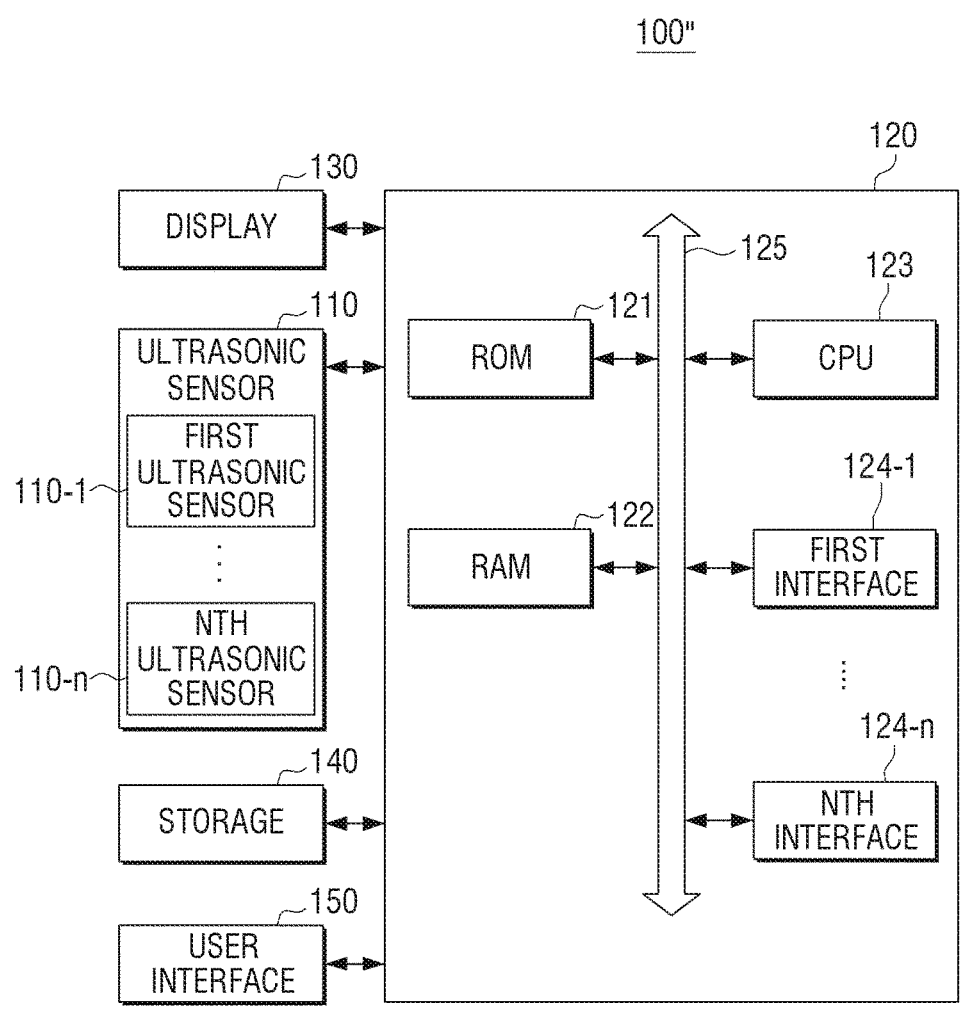
FIG. 11 is a block diagram of a touch recognition apparatus, according to another exemplary embodiment.

FIG. 11 is a block diagram of a touch recognition apparatus according to another exemplary embodiment. As illustrated in FIG. 11, a touch recognition apparatus 100" according to another exemplary embodiment includes the first to nth ultrasonic sensors 110-1~110-$n$, the processor 120, the display 130, the storage 140, and a user interface 150. Hereinafter, the configurations overlapped with FIGS. 1 to 10 will be omitted.

The processor 120 is an element that controls an overall operation of the touch recognition apparatus 100." In detail, the processor 120 includes a read only memory (ROM) 121, random access memory (RAM) 122 a main central processing unit (CPU) 123, first through $n^{th}$ interfaces 124-1 through 124-$n$, and a bus 125. Here, the ROM 121, the RAM 122, the main CPU 123, the first through $n^{th}$ interfaces 124-1 through 124-$n$, etc. may be connected to one another through the bus 125.

The CPU 123 accesses the storage 140 to perform booting by using a stored operating system (O/S). The CPU 123 may perform various operations by using various types of programs, contents, and data, etc. stored in the storage 140.

The ROM 121 stores a command set, etc. for booting a system. If a turn-on command is input to supply power, the CPU 123 copies the O/S stored in the storage 140 into the RAM 122 and executes the O/S to boot the system according to a command stored in the ROM 121. If booting is completed, the main CPU 123 copies various types of applications stored in the storage 140 into the RAM 122 and executes the application programs copied into the RAM 122 to perform various types of operations.

The first through $n^{th}$ interfaces 124-1 through 124-$n$ are connected to various types of elements as described above. One among the interfaces may be a network interface that is connected to an external apparatus through a network.

The above-described operation of the processor 120 may be performed by a program stored in the storage 140.

The storage 140 may store an O/S software module for driving the touch recognition apparatus 100" and various types of data such as various types of multimedia contents.

In detail, the storage 140 may store a base module that processes a signal transmitted from pieces of hardware included in the touch recognition apparatus 100," a storage module that manages a database (DB) or a registry, a graphic processing module that generates a screen of a layout, a security module, etc. The storage 140 may store programs of a ToF calculator module for detecting a ToF of an ultrasonic signal, a touch coordinate determiner module for detecting a touch point of an object, etc.

The user interface 150 is an element that senses a user interaction for controlling an overall operation of the touch recognition apparatus 100" and may include various types of interaction sensors such as a camera, a microphone, a touchscreen, etc.

Figure 12:
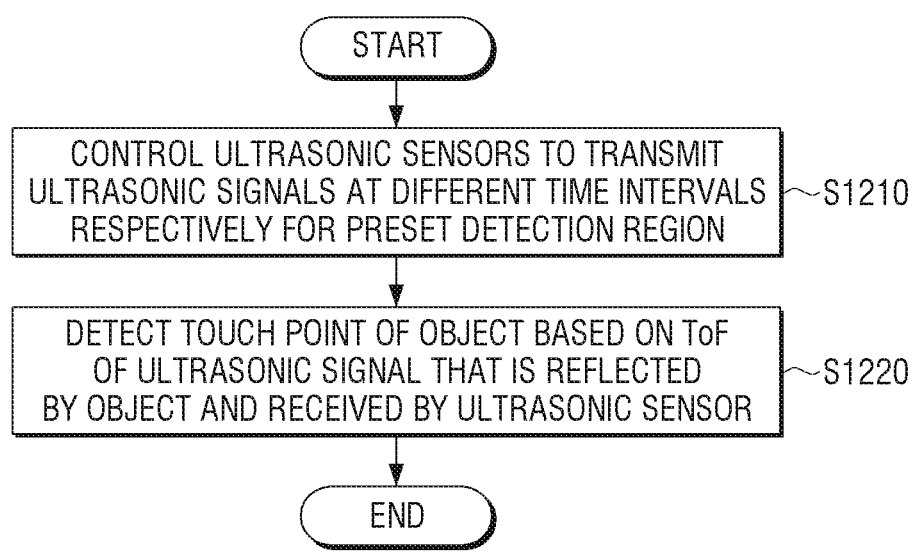
FIG. 12 is a flowchart of a method of controlling a touch recognition apparatus, according to an exemplary embodiment.

FIG. 12 is a flowchart of a method of controlling a touch recognition apparatus, according to an exemplary embodiment.

A plurality of ultrasonic sensors is controlled to transmit ultrasonic signals at different time intervals respectively for a preset detection region (S 1210). In this case, in the first detection region, the plurality of ultrasonic sensors are controlled to simultaneously transmit first ultrasonic signals, and in the second detection region, the plurality of ultrasonic sensors are controlled to transmit second ultrasonic signals at different times. In addition, in the second detection region, the plurality of ultrasonic sensors is controlled to sequentially transmit the second ultrasonic signals with preset delay intervals. Here, the delay intervals can be determined such that, in the preset detection region, the delay can be greater than a difference of receiving times of ultrasonic signals according to a maximum moving distance recognizable by the touch recognition apparatus.

Then, based on a ToF of an ultrasonic signal that is reflected by an object and received by an ultrasonic sensor, a touch point of the object is detected (S 1220). In this case, based on different receiving times of a plurality of ultrasonic signals that are generated according to different time intervals, ultrasonic sensors irradiating the received ultrasonic signals can be determined, and the ToF can be calculated.

In addition, in the first detection region, information regarding times of irradiating ultrasonic signals by a plurality of ultrasonic sensors and times of receiving the ultrasonic signals may be determined. In this case, in the second detection region, by using the information regarding the times of irradiating the ultrasonic signals by the plurality of ultrasonic sensors and the times of receiving the ultrasonic signals reflected or refracted by the object, ultrasonic sensors refracting the ultrasonic signals can be determined.

A plurality of ultrasonic sensors can use different frequencies of ultrasonic signals. In addition, phases of ultrasonic signals transmitted from a plurality of ultrasonic sensors can be different from each other, and pulse duration times of ultrasonic signals respectively transmitted from a plurality of ultrasonic sensors can be different from each other.

In addition, in the third detection region, a plurality of ultrasonic signals may be controlled to be transmitted at a time corresponding to a time of irradiating of a plurality of ultrasonic signals in the first detection region.

According to the exemplary embodiments described above, recognition time can be shortened in comparison to a time sharing method sequentially irradiating and receiving an ultrasonic wave for each ultrasonic sensor. Therefore, a touch recognition performance of a touch screen may be improved, and the touch screen may be easily provided to save cost.

In addition, the exemplary embodiments may also be implemented through computer-readable code and/or instructions on a medium, e.g., a computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A touch recognition apparatus comprising:
a first ultrasonic sensor;
a second ultrasonic sensor; and
a processor configured to:
in an initial time period, control the first ultrasonic sensor and the second ultrasonic sensors to simultaneously transmit a first ultrasonic signal and a second ultrasonic signal, respectively;
in a detection time period after the initial time period:
control the first ultrasonic sensor and the second ultrasonic sensors to sequentially transmit a third ultrasonic signal and a forth ultrasonic signal, respectively, the fourth ultrasonic signal being transmitted after a time interval after the third ultrasonic signal is started to be transmitted;
detect the third ultrasonic signal that is reflected from an object to the first ultrasonic sensor and the fourth ultrasonic signal that is reflected from the object to the second ultrasonic sensor, based on the time interval; and
detect a touch point of the object, based on a time of flight (ToF) of the reflected third ultrasonic signal and the reflected fourth ultrasonic signal.

2. The touch recognition apparatus of claim 1, wherein the processor is further configured to:
in the initial time period:
detect the first ultrasonic signal and the second ultrasonic signal that are respective reflected and refracted from the object to the first ultrasonic sensor; and detect the first ultrasonic signal and the second ultrasonic signal that are respectively refracted and reflected from the object to the second ultrasonic sensor;

in the detection time period after the initial time period:

detect the third ultrasonic signal that is reflected from the object to the first ultrasonic sensor and that is not delayed by the time interval, by comparing the third ultrasonic signal to the detected first ultrasonic signal reflected from the object to the first ultrasonic sensor; and detect the fourth ultrasonic signal that is reflected from the object to the second ultrasonic sensor and that is delayed by the time interval, by comparing the fourth ultrasonic signal to the detected second ultrasonic signal reflected from the object to the second ultrasonic sensor.

3. The touch recognition apparatus of claim 2, wherein the processor is further configured to:

in the initial time period:

determine an initial irradiation time at which the first ultrasonic signal and the second ultrasonic signal are simultaneously transmitted; and determine a first reception time, a second reception time, a third reception time, and a fourth reception time respectively at which the reflected first ultrasonic signal, the refracted second ultrasonic signal, the reflected second ultrasonic signal and the refracted first ultrasonic signal are received;

in the detection time period;

determine a first irradiation time and a second irradiation time respectively which the third ultrasonic signal and the fourth ultrasonic signal are sequentially transmitted;

determine a fifth reception time and a sixth reception time respectively at which the reflected third ultrasonic signal and the reflected fourth ultrasonic signal are received;

detect the reflected third ultrasonic signal, in response to a first difference between the first reception time and the initial irradiation time being equal to a second difference between the fifth reception time and the first irradiation tire; and detect the reflected fourth ultrasonic signal in response to a third difference between the fourth reception time and the initial irradiation time being less than a fourth difference between the sixth reception time and the first irradiation time by the time interval.

4. The touch recognition apparatus of claim 3, further comprising a storage configured to store the initial irradiation time, the first reception time, the second reception time, the third reception time and the fourth reception time, wherein the processor is further configured to retrieve the first reception time, the second reception time, the third reception time and the fourth reception time that are stored.

5. The touch recognition apparatus of claim 2, wherein the time interval is determined to be greater than a difference of reception times of the reflected second ultrasonic signal and the refracted first ultrasonic signal, based on a maximum moving distance recognizable by the touch recognition apparatus of the object.

6. The touch recognition apparatus of claim 2, wherein the processor is further configured to control the first ultrasonic sensor and the second ultrasonic sensor to:

simultaneously transmit a plurality of ultrasonic signals having different respective frequencies, in the initial time period; and sequentially transmit the plurality of ultrasonic signals having the different respective frequencies at different respective times, in the detection time period.

7. The touch recognition apparatus of claim 2, wherein the processor is further configured to control the first ultrasonic sensor and the second ultrasonic sensor to:

simultaneously transmit a plurality of ultrasonic signals having different respective phases, in the initial time period; and sequentially transmit the plurality of ultrasonic signals having different respective phases, at different respective times, in the detection time period.

8. The touch recognition apparatus of claim 2, wherein the processor is further configured to control the first ultrasonic sensor and the second ultrasonic sensor to:

simultaneously transmit a plurality of ultrasonic signals having different respective pulse durations, in the initial time period; and sequentially transmit the plurality of ultrasonic signals having the different respective pulse durations at different respective times, in the detection time period.

9. The touch recognition apparatus of claim 2, wherein the processor is further configured to, in a third time period after the detection time period, control the first ultrasonic sensor and the second ultrasonic sensor to simultaneously transmit a fifth ultrasonic signal and a sixth ultrasonic signal, respectively.

10. The touch recognition apparatus of claim 1, further comprising a display, wherein the object touches on the display.

11. A method of controlling a touch recognition apparatus, the method comprising:

in an initial time period, controlling a first ultrasonic sensor and a second ultrasonic sensor to simultaneously transmit a first ultrasonic signal and a second ultrasonic signal, respectively;

in a detection time period after the initial time period;

controlling the first ultrasonic sensor and the second ultrasonic sensor to sequentially transmit a third ultrasonic signal and a fourth ultrasonic signal, respectively, the fourth ultrasonic signal being transmitted after a time interval after the third ultrasonic signal is started to be transmitted;

detecting the third ultrasonic signal that is reflected from an object to the first ultrasonic sensor and the fourth ultrasonic signal that is reflected from the object to the second ultrasonic sensor, based on the time interval; and detecting a touch point of the object, based on a time of flight (ToF) of the reflected third ultrasonic signal and the reflected fourth ultrasonic signal.

12. The method of claim 11, further comprising:

in the initial time period:

detecting the first ultrasonic signal and the second ultrasonic signal that are respectively reflected and refracted from the object to the first ultrasonic sensor; and detecting the first ultrasonic signal and the second ultrasonic signal that are respectively refracted and reflected from the object to the second ultrasonic sensor;

in the detection time period after the initial time period:

detecting, the third ultrasonic signal that is reflected from the object to the first ultrasonic sensor and that is not delayed by the time interval, by comparing the third ultrasonic signal to the detected first ultrasonic signal that is reflected from the object to the first ultrasonic sensor; and detecting the fourth ultrasonic signal that is reflected from the object to the second ultrasonic sensor and that is delayed by the time interval, by comparing the fourth ultrasonic signal to the detected second ultrasonic signal that is reflected from the object to the second ultrasonic sensor.

13. The method of claim 12, further comprising:
in the initial time period:
   determining an initial irradiation time at which the first ultrasonic signal and the second ultrasonic signal are simultaneously transmitted; and
   determining a first reception time, a second reception time, a third reception time, and a fourth reception time respectively at which the reflected first ultrasonic signal, the refracted second ultrasonic signal, the reflected second ultrasonic signal and the refracted first ultrasonic signal are received; and
in the detection time period:
   determining a first irradiation time and a second irradiation time respectively at which the third ultrasonic and the fourth ultrasonic signal are sequentially transmitted;
   determining a fifth reception time and a sixth reception time respectively at which the reflected third ultrasonic signal and the reflected fourth ultrasonic signal are received;
   detecting the reflected third ultrasonic signal, in response to a first difference between the first reception time and the initial irradiation time being equal to a second difference between the fifth reception time and the first irradiation time; and
   detecting the reflected fourth ultrasonic signal, in response to a third difference between the fourth reception time and the initial irradiation time being less than a fourth difference between the sixth reception time and the first irradiation time by the time interval.

14. The method of claim 13, further comprising:
storing the initial irradiation time, the first reception time, the second reception time, the third reception time and the fourth reception time; and,
retrieving the first reception time, the second reception time, the third reception time and the fourth reception time that are stored.

15. The method of claim 12, wherein the time interval is determined to be greater than a difference of reception times of the reflected second ultrasonic signal and the refracted first ultrasonic signal, based on a maximum moving distance recognizable by the touch recognition apparatus of the object.

16. The method of claim 12, further comprising:
controlling the first ultrasonic sensor and the second ultrasonic sensor to simultaneously transmit a plurality of ultrasonic signals having different respective frequencies, in the initial time period; and
controlling the first ultrasonic sensor and the second ultrasonic sensor to sequentially transmit the plurality of ultrasonic signals having the different respective frequencies at different respective times, in the detection time period.

17. The method of claim 12, further comprising:
controlling the first ultrasonic sensor and the second ultrasonic sensor to simultaneously transmit a plurality of ultrasonic signals having different respective phases, in the initial time period,
controlling the first ultrasonic sensor and the second ultrasonic sensor to sequentially transmit the plurality of ultrasonic signals having the different respective phases at different respective times, in the detection time period.

18. The method of claim 12, further comprising:
controlling the first ultrasonic sensor and the second ultrasonic sensor to simultaneously transmit a plurality of ultrasonic signals having different respective pulse durations, in the initial time period,
controlling the first ultrasonic sensor and the second ultrasonic sensor to sequentially transmit the plurality of ultrasonic signals having the different respective pulse durations at different respective times, in the detection time period.

19. The touch recognition apparatus of claim 1, wherein the processor is further configured to:
in the detection time period:
   detect the third ultrasonic signal that is refracted from the object to the first ultrasonic sensor and that is delayed by the time interval, by comparing the refracted third ultrasonic signal to the refracted second ultrasonic signal that is detected;
   detect the fourth ultrasonic signal that is refracted from the object to the second ultrasonic sensor and that is not delayed by the time interval, by comparing the refracted fourth ultrasonic signal to the refracted first ultrasonic signal that is detected; and
   detect the touch point of the object, based on only the ToF of each of the reflected third ultrasonic signal and the reflected fourth ultrasonic signal that are detected, while excluding the refracted third ultrasonic signal and the refracted fourth signal that are detected.

* * * * *